C. F. ADAMSON.
TIRE VULCANIZING REPAIR APPARATUS.
APPLICATION FILED FEB. 19, 1912.
1,022,289.
Patented Apr. 2, 1912.
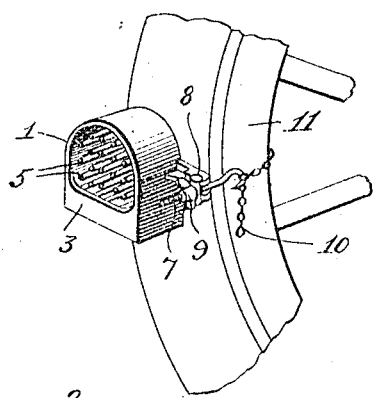
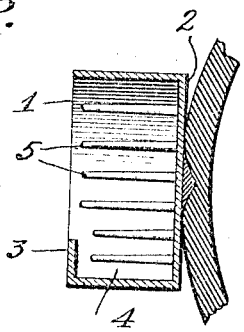
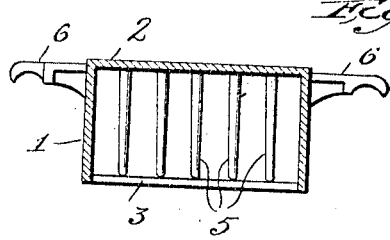
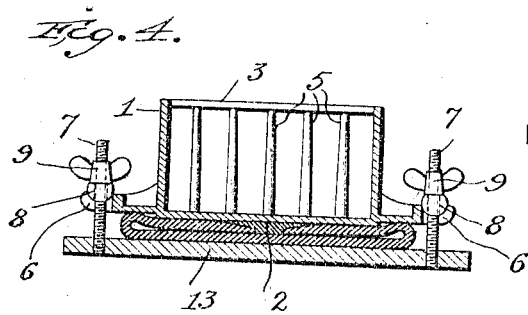
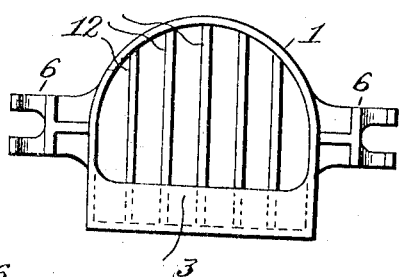
Witnesses
Inventor
Cecil F. Adamson
By Percy B. Hills
Attorney

UNITED STATES PATENT OFFICE.

CECIL F. ADAMSON, OF EAST PALESTINE, OHIO.

TIRE-VULCANIZING REPAIR APPARATUS.

1,022,289.  Specification of Letters Patent.  Patented Apr. 2, 1912.

Application filed February 19, 1912. Serial No. 678,518.

*To all whom it may concern:*

Be it known that I, CECIL F. ADAMSON, a citizen of the United States, residing at East Palestine, in the county of Columbiana and State of Ohio, have invented new and useful Improvements in Tire-Vulcanizing Repair Apparatus, of which the following is a specification.

The present invention relates to portable vulcanizing devices for repairing either the inner tubes of tires or tire treads or shoes when positioned on the vehicle wheel, whether inflated or not, and is designed as an improvement on an apparatus for the repair vulcanization of the inner tubes of tires only, disclosed in an application for Letters Patent filed by me October 25, 1911, Serial No. 656,604.

In the repair of tire shoes positioned on the vehicle wheel it is necessary that the vulcanizing apparatus be applied to the face of the tire shoe at a point where it lies in a substantially vertical plane, owing to the fact that the mud guard of the wheel would prevent its application upon the tire shoe at or near the top thereof, and it is the object of the present invention to provide a construction adapted to be applied in this position, as well as to be used in repairing tire tubes when removed from their shoes, as described in my application hereinbefore referred to, and embodying the broad principles of operation disclosed in said application.

In the accompanying drawing: Figure 1 is a perspective view of my improved device shown applied in operative position on a tire. Fig. 2 is a vertical transverse sectional view of the same. Fig. 3 is a horizontal sectional view of the same. Fig. 4 is a sectional view showing the device used in a horizontal position to repair a tire tube. Fig. 5 is a front elevation, showing a slightly modified construction.

In the said drawing, referring more particularly to Figs. 1, 2 and 3, the reference numeral 1 denotes a vulcanizing member of any desired shape and size, the same being in the form of a chamber open at one face, the opposite closed face 2 being designed to be applied to the surface to be repaired. The open side of said member is provided at one end with a flange 3, which, in conjunction with the body portion of said member, forms an open cupped face or fluid receiving and retaining chamber 4 at that portion of said member when the same is in a substantially vertical position. Within the body of said member 1 I provide a plurality of separate posts or pins 5 attached to or formed integral with the face 2, the same being disposed in any desired manner.

To provide for detachably attaching the device to a tire tread or shoe to be repaired I provide the member 1 with suitable ears 6, with which may be engaged clamping screw rods 7, and upon which may be loosely mounted followers 8 and thumb nuts 9. At their inner ends said screw rods 7 are detachably connected to a suitable chain 10 adapted to be passed around the rim 11 of the vehicle wheel.

In operation in repairing a tire shoe the vehicle wheel is first turned to bring the point in the tire shoe or tread to be repaired to a vertical plane, a piece of suitably prepared rubber is then applied to the defective spot, and the face 2 of member 1 applied centrally thereto in the usual manner by means of the chain 10 engaged with screw rods 7, which chain may be tightened at will to adjust the pressure of the face 2 of member 1 against the tire shoe or tread by the adjustment of the thumb nuts 9. A suitable quantity of some proper combustible liquid, such as gasolene, is then poured into the chamber 4 and ignited. The heating operation of the ignited fluid is substantially the same as that described in my application hereinbefore referred to, the heating fluid being in contact with the vulcanizing face 2. The initial combustion takes place within the member 1, thus heating the face 2, which heating action is materially aided by the posts or pins 5, which are connected to said face and act as heat transmitters thereto. As the fluid becomes heated more and more it volatilizes the more rapidly, and the combustion point shifts accordingly toward the exterior of the opening in the member 1, due to the fact that more oxygen is required to form a combustible mixture, and as the vulcanizing temperature of the rubber is substantially the same as the boiling point of the gasolene or like combustible fluid, any overheating of the face 2 is prevented. When the fluid has been consumed it will be found that the repair patch has been vulcanized to the required degree, and the operation is complete.

To employ the device in repairing a tire tube removed from its shoe I employ a clamping plate 13, like the clamping plate of my application hereinbefore referred to, the same serving to clamp the tube to the face 2 in precisely the same manner as that described in my said application, and as illustrated in Fig. 4.

In Fig. 5 I have shown a slightly modified construction, wherein the posts or pins 5 are replaced by a series of fins 12 lying in parallel relation with respect to each other and extending from the top to the bottom of said member 1 when the latter is in a substantially vertical position and in contact with the face 2, but preferably set back somewhat from the flange 3 to provide for the free flow of liquid throughout the member 1.

Having thus described my invention, what I claim as new and desire to secure by Letters Patent is:

1. A vulcanizing device, comprising a member having a vulcanizing face and an opposite open cupped face constructed to retain a charge of combustible fluid when disposed with its vulcanizing face lying in any plane from a horizontal to a vertical position, said member being constructed to direct the flame of said combustible fluid away from said vulcanizing face.

2. A vulcanizing device, comprising a combustible fluid retaining vulcanizing member adapted to operate with its vulcanizing face in any position from a horizontal to a vertical plane, and having one end formed to constitute a combustible fluid retaining chamber when the device is in a vertical position, said member formed open on its side opposite to the vulcanizing face.

3. A vulcanizing device, comprising a combustible fluid retaining vulcanizing member adapted to operate with its vulcanizing face in any position from a horizontal to a vertical plane, and having one end formed to constitute a combustible fluid retaining chamber when the device is in a vertical position, said member formed open on its side opposite to the vulcanizing face, and a series of heat transmitters connected to the inner side of said vulcanizing face and projecting toward the open side of said member.

In testimony whereof I have hereunto set my hand in the presence of two subscribing witnesses.

CECIL F. ADAMSON.

Witnesses:
   EVERETT L. LYON,
   OLLIE F. ALABACK.

---

Copies of this patent may be obtained for five cents each, by addressing the "Commissioner of Patents, Washington, D. C."